Figure 1:
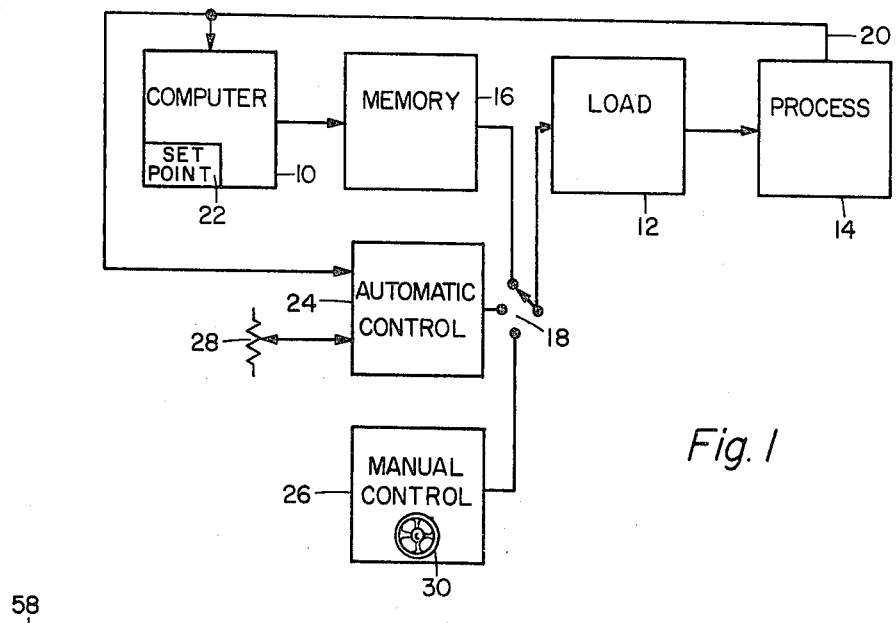

United States Patent
Roberts et al.

[15] 3,668,379
[45] June 6, 1972

[54] INTERFACE APPARATUS FOR COMPUTER INCLUDING AN INTEGRATOR CIRCUIT WHICH OPERATES TO PERMIT TRANSFER BETWEEN AUTOMATIC AND MANUAL CONTROL

[72] Inventors: Steven L. Roberts, Amherst, H.H.; Edward J. Miller, Jr., Tempe, Ariz.

[73] Assignee: Westinghouse Electric Corporation, Pittsburgh, Pa.

[22] Filed: Oct. 21, 1969

[21] Appl. No.: 868,155

[52] U.S. Cl. ...................235/183, 307/229, 318/591
[51] Int. Cl. .............................................G06g 7/18
[58] Field of Search ...........235/183, 153, 151.1; 328/127, 328/154; 307/229, 112; 318/520, 591, 609, 610, 611, 489; 320/1

[56] References Cited

UNITED STATES PATENTS

| | | |
|---|---|---|
| 2,679,022 | 5/1954 | McIlhenny...................318/611 X |
| 2,740,082 | 3/1956 | Sedgfield........................318/489 |
| 3,068,387 | 12/1962 | Koppel............................318/609 |
| 3,290,562 | 12/1966 | Faulkner et al..................328/127 X |
| 3,290,563 | 12/1966 | Hyer et al......................328/127 X |
| 3,340,408 | 9/1967 | Ogawa et al....................307/112 |
| 3,386,689 | 6/1968 | Parker et al....................318/590 X |
| 3,422,457 | 1/1969 | Koppel............................318/591 |
| 3,490,691 | 1/1970 | Uyetani et al..................235/183 |
| 3,493,773 | 2/1970 | Power.............................235/183 X |

*Primary Examiner*—Joseph F. Ruggiero
*Attorney*—Mueller and Aichele

[57] ABSTRACT

An apparatus is disclosed, including means to charge a capacitor and means to prevent leakage of the charge on the capacitor, to cause proper transfer of control, of the position of a tool or to change a step of a process, from a computer to a manual or automatic controller and in the reverse direction. The apparatus includes an integrator circuit which can be converted by proper manipulation of switches into a voltage following circuit.

10 Claims, 4 Drawing Figures

INVENTOR.
Steven L. Roberts
Edward J. Miller Jr.
BY
Mueller, Aichele & Rauner
ATTY'S INVENTOR.
Steven L. Roberts
Edward J. Miller Jr.
BY
Mueller, Aichele & Rauner
ATTY'S

INTERFACE APPARATUS FOR COMPUTER INCLUDING AN INTEGRATOR CIRCUIT WHICH OPERATES TO PERMIT TRANSFER BETWEEN AUTOMATIC AND MANUAL CONTROL

BACKGROUND

When a computer is set up to control the position of a tool or a step of a process (hereinafter process), an interface apparatus is provided between the output of the computer and a controlling means that actually controls the process to translate the output of the computer, which is an electrical pulse or a series of pulses, into a signal to actuate the controller. Since computers are very expensive, it is desirable that they perform several tasks at the same time on a time sharing basis. Therefore, the output of the computer that is applied to any one interface apparatus is an electrical signal in the nature of a pulse or a series of pulses occurring during short periodically recurrent periods. The interface apparatus must store the signal voltage between pulses thereof and must change the control voltage to a new value if the computer so directs when again the computer is connected to the interface apparatus. If the computer fails or if for any other reason an automatic or a manual control is substituted to apply control voltage to the interface apparatus, then a steady voltage is applied to the interface apparatus instead of the pulses applied thereto by the computer. The interface device must now follow the voltage output of the substituted control even though now a continuous or steady voltage is applied thereto instead of a pulse voltage. Furthermore, the interface apparatus must continually store a voltage corresponding to the instant progress of the substituted control so that if the computer is again connected to control the process, the change in the stored voltage in the interface apparatus (if any) required by the computer shall be of the order of size normally caused by the computer by successive control pulses, and not a large change as would be the case if the interface device failed to store a signal that corresponded to the substituted control.

It is an object of this invention to provide an improved interface apparatus between a computer and a tool or process step actuator.

It is a further object of this invention to provide an improved interface apparatus that can be operated by a computer on a time sharing basis and that continually stores a voltage corresponding to the progress of a process when operated by the computer, or stores a voltage corresponding to the substituted control when no longer computer controlled.

SUMMARY

In accordance with the invention, an interface apparatus is provided in which a pulse which is provided by a computer is integrated during the existence of the pulse and the integrated voltage is stored in a capacitor and the stored voltage is caused to provide a control voltage, which may be changed by the next applied pulse. Upon disconnecting the input of the interface circuit from the computer, integration ceases and a control voltage is stored on the capacitor which is a measure of a continuous control voltage applied to the interface apparatus by other, manual or automatic, control apparatus. Means including high impedance switch means such as high input impedance metal-oxide semiconductor field-effect transistors (hereinafter MOSFETs) are provided to preserve the charge on the capacitor between pulses produced by the computer and also during the changeover between modes of control of the interface apparatus.

DESCRIPTION

Figure 2:
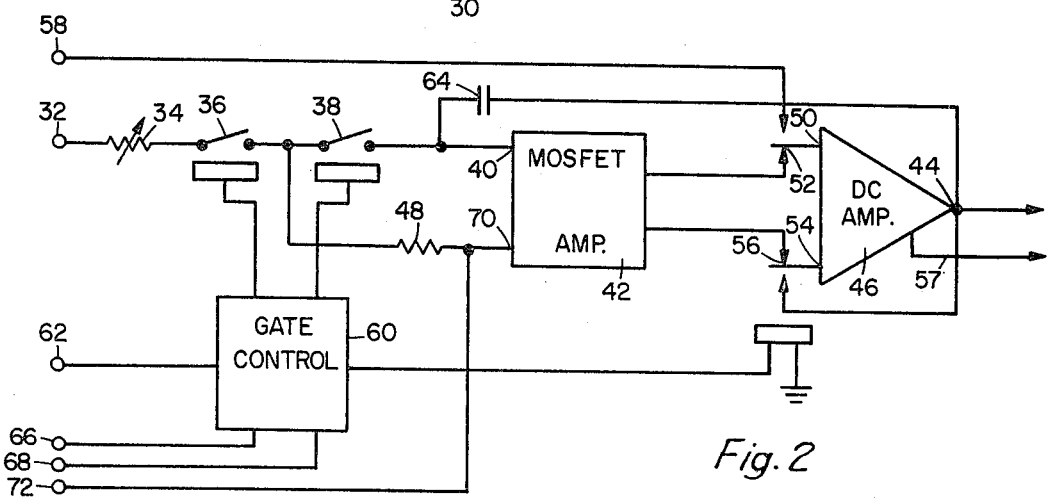
Figure 4:
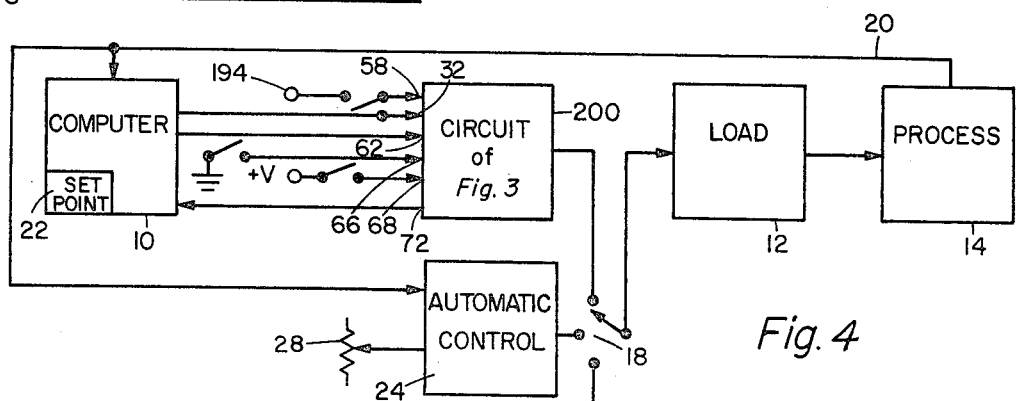
Figure 3:
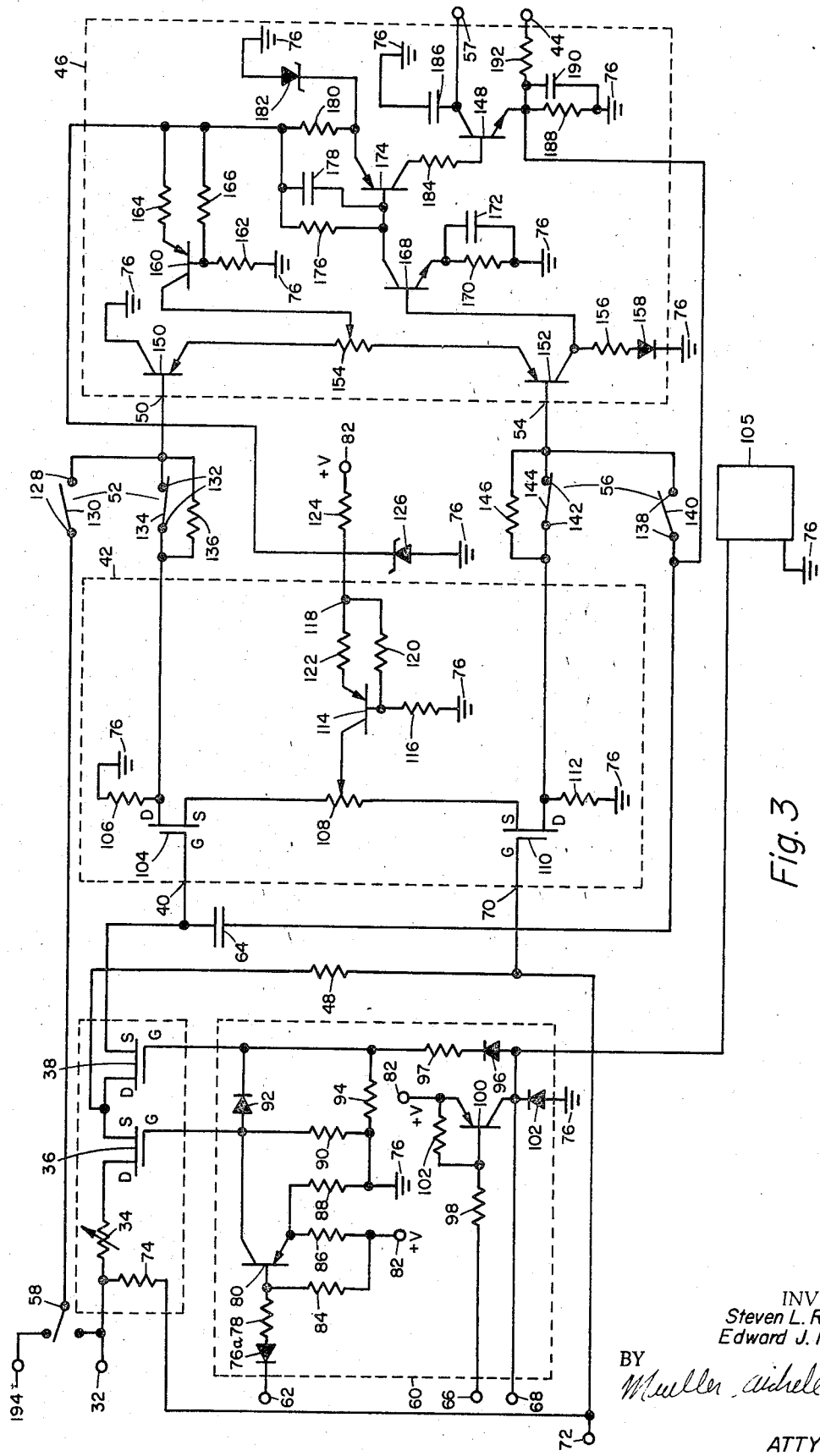

The invention will be better understood upon reading the following description in connection with the accompanying drawing in which:

FIG. 1 is a block diagram of a computer controlling a tool or process which is useful in explaining this invention, FIG. 2 is a block diagram of the interface circuit including an embodiment of this invention, FIG. 3 is a detailed circuit diagram of the interface circuit of FIG. 2, and FIG. 4 is a block diagram showing how the device of FIGS. 2 and 3 may be utilized.

Turning first to FIG. 1, a computer 10 controls a load 12 which in turn controls a process 14 for example, by way of a memory apparatus circuit 16. That is, the computer, which is used in a time sharing manner, provides discrete pulses to a memory means 16 which stores the voltage corresponding to the pulses. A memory 16 applies the stored voltage to the load means 12 by means of a switch 18. The load 12 may be a valve which admits a greater or lesser or an unchanged amount of fluid under pressure to a cylinder depending on the voltage stored in the memory 16, to control a step in a process. The new condition of the work is fed back as an electrical voltage to the computer 10 by way of a conductor 20 and this voltage is compared with a set voltage set into the set point part 22 of the computer 10, and the error or difference voltage is one of the inputs to the computer 10 to cause it to apply pulses to the memory circuit 16, to cause the process to proceed in an optimum manner to its proper conclusion. It is noted that pulses are applied to the memory 16 and that a steady voltage is applied thereby to the load 12. Now let it be assumed that for some reason, such as failure of the computer 10, it is desired to control the process by an automatic control 24 or a manual control 26. If the automatic control 24 is chosen, the switch 18 is manipulated to connect the automatic control 24 to the load 12 and an error voltage is produced in the automatic control 24 by comparison of the voltage on the conductor 20, which is a measure of the instant point of the process, with the voltage appearing across a means such as a potentiometer 28, to control the load 12 to cause the processing to take place as desired. If the manual control is chosen, by manipulating the switch 18, to connect the electrical output of the manual control means 26 to the load 12, then the operator observes the process and changes the voltage output of the manual control as by rotating a knob 30 as his judgment dictates. In either automatic control mode or manual control mode, the voltage stored in the memory 16 may be discharged towards zero, or at best remains unchanged, whereby, when control of a computer 10 is resumed, a much greater change may be necessary in the charge stored in the memory 16 than if the voltage stored in the memory 16 continuously followed the instant point in the process as it is varied during the period of automatic or manual control. Furthermore, if the memory 16 were connected to the process apparatus by the conductor 20, then the memory 16, which is constructed to store a voltage in response to a pulse, would store an incorrect voltage in response to the continuous voltage that would be applied thereto by the conductor 20. According to the invention, the interface circuit of FIGS. 2 and 3 is substituted for the memory circuit 16 of FIG. 1.

In FIG. 2, the pulse output of the computer 10 (not shown in FIG. 2) is applied to the terminal 32. The terminal 32 is connected by way of a variable resistor 34 and two normally open switches 36 and 38 in series to one input terminal 40 of a MOSFET amplifier 42. The resistor 34 controls the ratio of the output voltage at an output terminal 44 of a DC amplifier 46 to the input voltage at the terminal 32. A point between the switches 36 and 38 is connected through a coupling resistor 48 to the other input terminal 70 of the MOSFET amplifier 42. One output of the MOSFET amplifier 42 is connected to one input terminal 50 of a DC amplifier 46 by way of the normally closed contacts of a single pole double throw switching means 52. The other output terminal of the MOSFET amplifier 42 is connected to the other input terminal 54 of the amplifier 46 by way of the normally closed contacts of a single pole double throw switching means 56. The switches 52 and 56 may physically be a double pole double throw relay. The other contact of the switch 52 is connected to a terminal 58 through which a continuous voltage provided by the substituted control (automatic or manual, not shown in FIG. 2) may be connected. The other contact of the switch 56 is connected to the voltage output point 44 of the amplifier 46. A variable load controlling voltage appears at the output 44. If desired, an additional output terminal 57 may be provided for the DC amplifier 46 from which a variable load controlling current may be taken. A capacitor 64 connects the output 44 of the amplifier 46 with the input terminal 40 of the MOSFET amplifier 42. When the switches 52 and 56 are in the position shown, the two cascaded amplifiers 42 and 46 and including the feedback capacitor 64 comprise an integrator.

A gate control 60 causes closure of switches 36 and 38 upon application by the computer 10 of a gating pulse to the input terminal 62 of the gate control. A low override input terminal 66 and a high override input terminal 68 are provided for the gate control 60. When ground is applied to the terminal 66 or a high voltage is applied to the terminal 68, the switch 38 is closed while the switch 36 remains open and the switching means 52 connects the terminal 58 to the terminal 50 of the amplifier 46, while the switching means 56 connects the voltage output terminal 44 of the amplifier 46 to the input terminal 54 of this amplifier 46, whereby the MOSFET amplifier 42 and the DC amplifier 46 are no longer an integrator and the voltage at the output terminal 44 follows the voltage at the terminal 58. The capacitor 64, which is connected directly to one input terminal 40 of the MOSFET amplifier 42 and through the closed switch 38 and the resistor 48 to the other terminal 70 of the MOSFET amplifier 12, assumes a charge that is equal to the voltage at the output terminal 44 which in turn follows the voltage at the terminal 58. The terminal 72, which is connected to the capacitor 64 by way of the resistor 48 and the switch 38, is a voltage reference point for the computer 10.

When the control by the computer 10 is restored and the several switches and switching means take the position as shown in FIG. 2, there is no discharge path for the capacitor 64 and it retains the charge put thereon previously, that is, while the input terminals 50 and 54 were respectively connected to the terminals 58 and 44. Therefore, when the interface circuit of FIG. 2 is controlled by a computer 10, the MOSFET amplifier 42 and the DC amplifier 46 and the capacitor 64 act as an integrator whereby the voltage across the capacitor 64 is determined by the pulse provided by the computer 10 to the terminal 32, and when the interface circuit of FIG. 2 is not controlled by the computer 10 the voltage across the capacitor 64 is and remains the voltage appearing at the terminal 58, which is a measure of the point of progress in the process being performed by the circuit of FIG. 1. For example, the terminal 58 may be connected to the output of the automatic control 24 or of the manual control 26. A more detailed account of the construction and operation of the circuit of FIG. 2 will be given in connection with the description of the circuit of FIG. 3. FIG. 4 illustrates the connection of FIG. 3 in the circuit of FIG. 1. In FIGS. 1, 2, 3, and 4, like reference elements have been given the same reference characters.

The computer output terminal 32 is connected by way of an input resistor 74 to the computer reference voltage terminal 72. Referring to FIG. 3, the switches 36 and 38 take the form of insulated gate field-effect transistors, the terminal 32 being connected through the variable resistor 34 to the drain of a transistor 36. The source of the transistor 36 is connected to the drain of the transistor 38. The source of the transistor 38 is connected to the input terminal 40 of the MOSFET amplifier 42. A point between the source of the transistor 36 and the drain of the transistor 38 is connected by way of the resistor 48 to the other input terminal 70 of the MOSFET amplifier 42.

The gating output terminal 62 of the computer 10 is connected to the cathode of a diode 76a forming part of the gate control 60. The anode of the diode 76 is connected through a resistor 78 to the base of a PNP transistor 80. The base of the transistor 80 is connected to a point of positive potential 82 with respect to ground 76 by way of a resistor 84. The emitter of the transistor 80 is connected to the terminal 82 by way of a resistor 86. The emitter of a transistor 80 is also connected to ground 76 by way of a resistor 88. The collector of the transistor 80 is connected to the gate of the transistor 36 and to ground 76 by way of a resistor 90 and to the anode of a diode 92. The cathode of the diode 92 is connected to the gate of the transistor 38, to ground 76 by way of a resistor 94, and to the cathode of a diode 96 by way of a resistor 97. The low override terminal 66 is connected by way of a resistor 98 to the base of a PNP transistor 100. The base of the PNP transistor 100 is connected by way of a resistor 102 to a positive voltage terminal 82. The emitter of the transistor 100 is also connected to the terminal 82. The collector of the transistor 100 is connected to the high override terminal 68, to the anode of the diode 96, and to the cathode of a diode 102. The anode of the diode 102 is connected to ground 76. The terminal 68 is also connected through a relay operator 105 for the switching means 52 and 56 to ground 76. The input terminal 70 of the MOSFET amplifier 42 is connected to the computer reference voltage terminal 72.

The input terminal 40 is connected to the gate of an insulated gate field-effect transistor 104 (also called a metal oxide semiconductor field-effect transistor). The drain of the transistor 104 is connected to ground 76 by way of a load resistor 106. The drain of the transistor 104 constitutes one of the output terminals of the MOSFET amplifier 42. The source of the transistor 104 is connected to one end of a potentiometer 108, whose other end is connected to the source of an insulated gate field-effect transistor 110. The other input terminal 70 of the amplifier 42 is connected to the gate of the transistor 110. The drain of the transistor 110 is connected to ground 76 by way of a load resistor 112. The drain of the transistor 110 is the other output terminal of the amplifier 42. A constant current supply for the two transistors 104 and 110 comprises a PNP transistor 114. The collector of the transistor 114 is connected to the slider on the potentiometer 108. The base of the transistor 114 is connected to the ground 76 by way of a resistor 116 and to a constant voltage point 118 by way of a resistor 120. The emitter of the transistor 114 is also connected to the point 118 by way of a resistor 122. As the current through the resistor 122 tends to vary, the varying voltage drop thereacross is applied between the base and the emitter of the transistor 114 to tend to keep the current flow through the transistor 114 constant whereby constant current is supplied to the slider on the potentiometer 108 by the constant current transistor 114. Constant voltage is applied to the point 118 due to the fact that it is connected to a positive voltage supply terminal 82 by way of a resistor 124 and due further to the fact that the point 118 is shunted to ground 76 by way of the zener diode 126.

The switch 52 comprises a pair of contacts 128 bridged by a moveable normally open contact element 130 and a pair of contacts 132 bridged by a moveable normally closed contact element 134. A resistor 136 is connected across the contacts 132. The terminal 58 is connected to one of the contacts 128 and the other of the contacts 128 is connected to the input terminal 50 of the DC amplifier 46. The drain of the transistor 104 is connected to one of the contacts 132 and the other of the contacts 132 is also connected to the terminal 50.

The switching means 56 comprises a pair of contacts 138 bridged by a moveable, normally open contact element 140 and a pair of contacts 142 bridged by a moveable normally closed contact element 144. A resistor 146 is connected across the contacts 142. The input terminal 40 of the amplifier 42 is connected by way of the capacitor 64 to one of the contacts 138 and also to the emitter of an NPN transistor 148 comprising part of the DC amplifier 46. The other one of the contacts 138 is connected to the input terminal 54 of the amplifier 46. The drain of the transistor 110 is connected to one of the contacts 142. The other of the contacts 142 is connected directly to the input terminal 54.

The direct current amplifier 46 comprises a pair of PNP transistors 150 and 152 having their bases connected, respectively, to the input terminals 50 and 54 and having their emitters connected together through a potentiometer resistor 154. The collector of the transistor 150 is directly connected to ground 76. The collector of the transistor 152 is connected to ground 76 by way of a resistor 156 and the anode to cathode path of a diode 158. Constant current is supplied to the slider of the potentiometer 154 by means including a PNP transistor 160. The collector of the transistor 160 is connected to the slider of the potentiometer 154. The base of transistor 160 is connected to ground 76 by way of resistor 162. The emitter and the base of the transistor 160 are connected by way of respective resistors 164 and 166 to the constant voltage point 118. The operation of the transistor 160 for the production of a constant current is the same as the operation of the transistor 114. The collector of the transistor 152 is also connected to the base of an NPN transistor 168. The emitter of the transistor 168 is connected to ground 76 by way of a resistor 170 which is shunted by a capacitor 172. The collector of the transistor 168 is connected to the base of a PNP transistor 174. The base of the transistor 174 is connected to the point 118 by way of a resistor 176 which is shunted by a capacitor 178. The emitter of the transistor 174 is connected to the point 118 by way of a resistor 180 and to ground 76 by a zener diode 182. The collector of the transistor 174 is connected to the base of the transistor 148 by way of a resistor 184. The collector of the transistor 148 is connected to ground 76 by way of a capacitor 186 and to the current output terminal 57 of the amplifier 46. The emitter of the transistor 148 is connected to ground 76 by way of a resistor 188 which is shunted by a capacitor 190. The emitter of the transistor 148 is also connected to the voltage output terminal 44 of the amplifier 46 by way of a resistor 192.

The operation of the circuit of FIG. 3 is as follows: Let it be assumed that the computer 10 of FIG. 1 is supplying control pulses on a time sharing basis to the interface circuit of FIG. 3. Then the computer 10 applies a gating voltage at periodic intervals and for the same successive durations of time to the terminal 62. The gating voltage may be ground potential. This gating potential renders the transistor 80 conductive which causes the application of a voltage to the gate of the two transistors 36 and 38 so as to render transistors 36 and 38 conductive. During a predetermined portion of each of these periodic intervals, a control pulse is applied to the terminal 32 by the computer 10 to control the process. This control pulse is of constant duration, starting after the beginning of the gating voltage and ending before the gating voltage ends. The control pulse may be positive or negative in direction and of an amplitude as determined by the control to be applied to the load of FIG. 1. Since the switch contacts 132 and 142 are closed, the output of the amplifier 42 is coupled to the input of the amplifier 46 and the voltage output of the amplifier 46 is coupled to an input 40 of the amplifier 42 by way of the capacitor 64. Therefore, the amplifiers 42 and 46 in conjunction with the capacitor 64 act as an integrator, and the voltage at the point 44 and, therefore, across the capacitor 64 goes up or down during the duration of the control pulses applied to the terminal 32 in accordance with the direction thereof, and the voltage across the capacitor 64 changes at a rate determined by the amplitude of the pulses applied to the terminal 32. The voltage at the point 44 remains constant between gating pulses due to the fact that the capacitor 64 cannot discharge, one plate thereof being connected to the insulated gate of the transistor 104 and also to the source of the nonconductive transistor 38.

Let it be assumed that control is to be taken away from the computer 10. Then by means not shown in FIG. 3, ground potential is applied to the low override terminal 66 or high potential is applied to the high override terminal 68. In either case, high potential appears at the gate of the transistor 38 making the transistor 38 conductive, but due to the presence of the diode 92, low potential is applied to the gate of the transistor 36, whereby it remains nonconductive. At the same time, the relay or switch operator 105 is energized whereby the contacts 128 and 138 close and the contacts 132 and 142 open. The resistors 136 and 146 across the contacts 132 and 142 respectively prevent the occurrence of open base circuits for the transistors 150 and 152, respectively, while, during the operation of the switching means 52 and 56, both pairs of contacts of each switching means are open. When the contacts 132 and 142 are open, the output of the MOSFET amplifier 42 is no longer coupled to the DC amplifier 46, whereby the amplifiers 42 and 46 and the capacitor 64 no longer act as a ramp or integrator circuit. Closing the switch contacts 130 applies the voltage at the terminal 58, which is a measure of the position of the tool or of the progress of a step in the control process, to the input 50 of the DC amplifier 46. Closing the contacts 138 short circuits the input 54 to the voltage output 44 of the DC amplifier 46, causing the DC amplifier 46 to act as an operational amplifier, whereby the voltage at the output terminal 44 is equal to or follows the voltage at the terminal 58. One terminal of the capacitor 64 is connected to the terminal 44. The rendering conductive of the transistor 38 connects the other terminal of the capacitor 64 to the input terminal 70 of the MOSFET amplifier 42 in series with the resistor 48. The capacitor 64 assumes a charge corresponding to the voltage at the input terminal 58 and this voltage cannot discharge due to the connection of the other capacitor terminal to the insulated gates of the transistors 104 and 110. The connection of the terminal 70 to the terminal 72 applies a reference potential from the computer 10 to the terminal of the capacitor 64 which is not directly connected to the output terminal 44 by way of the transistor 38 when it is conductive in series with the resistor 48. Therefore, when the computer 10 is not controlling the position of the tool or the progress of the method being controlled, the charge on the capacitor 64 follows the position of the tool or the progress of the process, and this change is preserved on the capacitor 64 since it cannot leak off. Later, when the computer 10 is again switched in to control the progress of the work or process, the voltage across the capacitor 64 needs to be changed only very little compared to the change that would have been necessary if the charge on the capacitor 64 had not been made to track the progress of the work or of the process or if the charge thereacross had leaked off during change of control back to the computer, or during any waiting period.

If desired, the input terminal 58 may be connected to the control wave input 32 from the computer 10 or to a set point connection 194 by a switch shown in FIG. 4, to bring the charge on the capacitor 64 to the voltage of the output of the computer or of the set point in starting the control process at any particular point.

FIG. 4 illustrates the connection of the interface circuit of FIG. 3, represented by the rectangle 200 in a system diagram of FIG. 4. It will be noted that the circuit 200 takes the place of the memory 16 of FIG. 1, since in fact the circuit 200 includes a memory. The terminal 58 may be connected to a set point 194 or to the control pulses provided by the computer by way of the switch shown. The control pulses and the gate pulses are fed from the computer 10 to the input terminals 32 and 62, respectively, of the circuit 200 and the computer reference point is connected to the terminal 72 of the circuit 200. Furthermore, respective switch means are provided to connect ground or high voltage to terminals 66 and 68.

What is claimed is:

1. An interface circuit between a computer and a load wherein the load has a computer and a second mode of operations, the interface circuit controls the load in the computer mode of operation and the other means controls the load in the second mode of operation comprising:

integrating means having input terminals and an output terminal and being operable during said computer mode for integrating pulses applied to one of said input terminals by said computer to provide an integrated voltage and including a storage means, said integrated voltage appearing across said storage means, means during said second mode to convert said integrating means to a voltage following circuit whereby a continuous voltage of a certain magnitude applied to the other input terminal of said integrating means when converted causes a continuous voltage of the same magnitude to appear at the output terminal of said integrating means when converted, and means during said second mode of operation to apply the voltage at the output terminal of said integrating means when converted to said storage means for storing same during said second mode of operation, and said stored voltage remaining at said stored value initially during any transfer from said second mode of operation to said computer mode of operation.

2. The invention of claim 1 in which said integrating means comprises an amplifier having an input and an output terminal, said storage means being connected between said input and output terminals of said amplifier.

3. The invention of claim 1 in which said integrating means when converted comprises an amplifier having an input and an output connection and a direct current connection between said input and said output connections of said amplifier.

4. The invention of claim 1 in which said integrating means comprises two cascaded amplifiers and an input terminal for the first one of said cascaded amplifiers and an output terminal for the second one of said cascaded amplifiers, and in which said storage means is a capacitor connected between said input and said output terminals of said cascaded amplifiers.

5. The invention of claim 4 in which said first amplifier comprises at least one insulated gate field-effect transistor and said input terminals of said amplifier are connected to the gate of said insulated gate field-effect transistor.

6. The invention of claim 1 in which a further input terminal is provided and in which the drain to source connection of an insulated gate field-effect transistor is connected in series between said further input terminal and one of said integrating means input terminals and means are provided to render said transistor alternately conductive and nonconductive.

7. The invention of claim 1 in which a further input terminal is provided and in which the drain to source paths of two insulated gate transistors are connected in series between said further input terminal and one of said integrator input terminals and in which means are provided to render said transistors conductive or nonconductive simultaneously and further means are provided to render one of said transistors conductive while the other thereof remains nonconductive.

8. The invention of claim 7 in which said storage means is a capacitor, one terminal of said capacitor being connected to a point between said transistors, the said one terminal of said capacitor being connected to the said one input terminal of said integrator and the other terminal of said capacitor being connected to the output terminal of said integrator.

9. The invention of claim 1 in which said integrating means comprises a first and a second amplifier connected in cascade, said storage means being connected between an output terminal of said second amplifier and an input terminal of said first amplifier and in which said means to convert said integrating means to a voltage following means comprises a switching means between said first and second amplifiers to disconnect the cascaded connection of said first and second amplifiers and for connecting the output of said second amplifier to an input of said second amplifier.

10. An interface circuit between a computer and a load comprising:
two switches,
a first amplifier having two input and two output terminals,
a second amplifier having two input terminals and an output terminal,
a normally conductive first switching means connected between an output terminal of said first amplifier and an input terminal of said second amplifier,
a normally conductive second switching means connected between the other input terminal of said first amplifier and the other input terminal of said second amplifier,
a capacitor,
a connection between an input point and said first input terminal of said first amplifier by way of said two switches in series,
normally nonconductive third and fourth switching means,
a connection from said first input terminal of said second amplifier by way of said third switching means to a point to which a continuous voltage may be applied,
a connection from said output terminal of said second amplifier to the first input terminal of said first amplifier by way of said capacitor,
a direct current connection between the output terminal of said second amplifier by way of said fourth switching means to the other input terminal of said second amplifier,
a direct current connection between a point between said two switches and said other input terminal of said first amplifier,
means to cause said two switches to become conductive simultaneously, and
means to cause one of said two switches to become conductive while rendering said first and second switching means nonconductive and said third and fourth switching means conductive.

* * * * *